(12) United States Patent
Knight et al.

(10) Patent No.: US 10,964,181 B1
(45) Date of Patent: Mar. 30, 2021

(54) FIBER OPTIC TAMPER SWITCH

(71) Applicant: B/E Aerospace, Inc., Winston-Salem, NC (US)

(72) Inventors: Philip A. Knight, Greer, SC (US); Robert J. Hanlin, Simpsonville, SC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 16/688,747

(22) Filed: Nov. 19, 2019

Related U.S. Application Data

(60) Provisional application No. 62/821,868, filed on Mar. 21, 2019.

(51) Int. Cl.
*G08B 13/14* (2006.01)
*G08B 13/186* (2006.01)

(52) U.S. Cl.
CPC ..... *G08B 13/1463* (2013.01); *G08B 13/1481* (2013.01); *G08B 13/186* (2013.01)

(58) Field of Classification Search
None
See application file for complete search history.

(56) References Cited

U.S. PATENT DOCUMENTS

| | | | |
|---|---|---|---|
| 5,003,292 A | 3/1991 | Harding et al. | |
| 7,109,873 B2 | 9/2006 | Giotto et al. | |
| 8,229,529 B2 | 7/2012 | Schmitt | |
| 8,514,076 B2 | 8/2013 | Piper, Sr. et al. | |
| 8,867,867 B2 | 10/2014 | McNeilly et al. | |
| 2014/0283146 A1 | 9/2014 | Obukhov | |

*Primary Examiner* — Steven Lim
*Assistant Examiner* — Muhammad Adnan
(74) *Attorney, Agent, or Firm* — Suiter Swantz pc llo

(57) ABSTRACT

A fiber optic tamper switch is disclosed, wherein a moveable member is moved to actuate the switch. The switch includes a component subassembly block and a cover. The switch includes a toggle arm extending through the cover, contacting the moveable member and configured to rotate when the moveable member is moved. The switch includes a fiber capture bar configured to receive a fiber optic cable and a fiber press bar coupled to the fiber capture bar configured to actuate upon the movement of the toggle arm and translate the fiber capture bar in a first direction, effecting a bend in the fiber optic cable. The fiber optic cable is configured to attenuate a light signal when bent. The switch includes a locking mechanism preventing the unbending of the fiber optic cable.

20 Claims, 9 Drawing Sheets

FIBER OPTIC TAMPER SWITCH

CROSS-REFERENCE TO RELATED APPLICATIONS

The present application claims the benefit under 35 U.S.C. § 119(e) of U.S. Provisional Application Ser. No. 62/821,868, filed Mar. 21, 2019, and titled "FIBER OPTIC TAMPER SWITCH," which is incorporated herein by reference in its entirety.

BACKGROUND

Security systems are commonly used to alert security personnel when sensitive areas are accessed by unauthorized persons. The ability of security systems to safeguard sensitive areas is limited by the potential of unauthorized persons to thwart these security measures. The greater importance of the security concern often necessitates the development of more comprehensive and developed security measures.

Security systems used for access points (e.g., doors or windows) have traditionally used an electrical current to carry a signal between the point of entry and a monitoring system. However, electrical monitoring systems are not recommended for extreme environments (e.g., underground or submerged areas) and can be easily thwarted by bypassing the electrical signal. More recently, security systems based on transmission of light thought fiber optic cable security systems have been developed. These systems are more stable in hostile environments than electrical monitoring systems.

Sensors for fiber optic security systems alter the signal of light transmitted through the optical fiber of a fiber optic cable after detecting movement (e.g., of a door or object). These sensors are often sealed to prevent water, dust or other environmental contaminants from entering and breaking the fragile components of the sensor. Over time, however, the seals deteriorate, resulting in sensor failure. Installing and replacing fiber optic sensors also require the optic cable to be spliced at each sensor. Splicing fiber optic cables is a complicated and time-consuming process that requires training. Consequently, there is need for a fiber optic sensor that allow easy installation and is impervious to harsh environmental conditions.

SUMMARY

A fiber optic tamper switch is disclosed, wherein a moveable member must be moved in order to actuate the fiber optic tamper switch. In one or more embodiments, the fiber optic tamper switch includes a component subassembly block. The fiber optic tamper switch may also include a cover encompassing the component subassembly block. The fiber optic tamper switch may also include a toggle arm. The toggle arm may include a first end coupled to a first shaft or hub that arises substantially perpendicular to a face of the component subassembly block. The toggle arm may be configured to rotate along a central axis of the first shaft and/or hub. The toggle arm may include a second end that extends through the cover, where it may contact a moveable member. The toggle arm is further configured to rotate along the first shaft and/or hub when the moveable member is moved. The fiber optic tamper switch may further include a fiber capture bar. The fiber capture bar may be configured to permit the threading of the optical fiber and/or fiber optic cable through a recess within the fiber capture bar. The fiber optic tamper switch may further include a fiber press bar. The fiber press bar may be configured to couple to the fiber capture bar. The fiber press bar may be further configured to actuate upon the movement of the toggle arm. The fiber press bar may be further configured to translate the fiber capture bar in a first direction, effecting a bend in the optical fiber and/or fiber optic cable. The optical fiber and/or fiber optic cable may be further configured to attenuate and/or disperse a light signal within the optical fiber and/or fiber optic cable when the optical fiber and/or fiber optic cable is bent. The fiber optic tamper switch may further include one or more locking mechanisms coupled to the toggle arm and/or the fiber press bar, preventing the movement of the fiber capture bar and/or the unbending of the optical fiber and/or fiber optic cable.

In some embodiments, the fiber optic tamper switch may further include one or more release mechanisms for the one or more locking mechanisms. The unlocking mechanism may be further configured to unlock the toggle arm, the fiber press bar, and/or unbend the optical fiber and/or fiber optic cable.

A fiber optic tamper switch system is also disclosed. In one or more embodiments, the system includes one more optical fibers and/or fiber optic cables. The system may also include a fiber optic tamper switch. In one or more embodiments, the fiber optic tamper switch includes a component subassembly block. The fiber optic tamper switch may also include a cover encompassing the component subassembly block. The fiber optic tamper switch may also include a toggle arm. The toggle arm may include a first end that coupled to a first shaft or hub that arises substantially perpendicular to a face of the component subassembly block. The toggle arm may be configured to rotate along a central axis of the first shaft and/or hub. The toggle arm may include a second end that extends through the cover, where it may contact a moveable member. The toggle arm is further configured to rotate along the first shaft and/or hub when the moveable member is moved. The fiber optic tamper switch may further include a fiber capture bar. The fiber capture bar may be configured to permit the threading of the optical fiber and/or fiber optic cable through a recess within the fiber capture bar. The fiber optic tamper switch may further include a fiber press bar. The fiber press bar may be configured to couple to the fiber capture bar. The fiber press bar may be further configured to actuate upon the movement of the toggle arm. The fiber press bar may be further configured to translate the fiber capture bar in a first direction, effecting a bend in the optical fiber and/or fiber optic cable. The optical fiber and/or fiber optic cable may be further configured to attenuate and/or disperse a light signal within the optical fiber and/or fiber optic cable when the optical fiber and/or fiber optic cable is bent. The fiber optic tamper switch may further include one or more locking mechanisms coupled to the toggle arm and/or the fiber press bar, preventing the movement of the fiber capture bar and/or the unbending of the optical fiber and/or fiber optic cable. The system may also include a fiber optic light source that is communicatively coupled to the optical fiber or fiber optic cable. The system may further include a fiber optic light detector that is communicatively coupled to the optical fiber or fiber optic cable. The system may also include a controller. The controller may be configured to be communicatively coupled to the fiber optic light source, the fiber optic light detector and/or the optical fiber and/or fiber optic cable. The controller may be further configured to control the light signal that is broadcast through the optical fiber or fiber optic cable. The controller may be further configured to determine an attenuation and/or dispersion of the light signal from the optical fiber and/or fiber optic signal. The system may also include a user interface communicatively coupled to the controller. The user interface may be further configured to receive optical fiber tamper switch data from the controller. The user interface may also be configured to display optical tamper switch data.

In some embodiments, the controller utilizes optical time-domain reflectometry to detect the position of an attenuation and/or dispersion of the light signal within the optical fiber and/or fiber optic cable. In other embodiments, the controller utilizes the optical signal difference between an optical source and an optical receiver to determine if an attenuation and/or dispersion of the light signal has occurred within the optical system or circuit.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
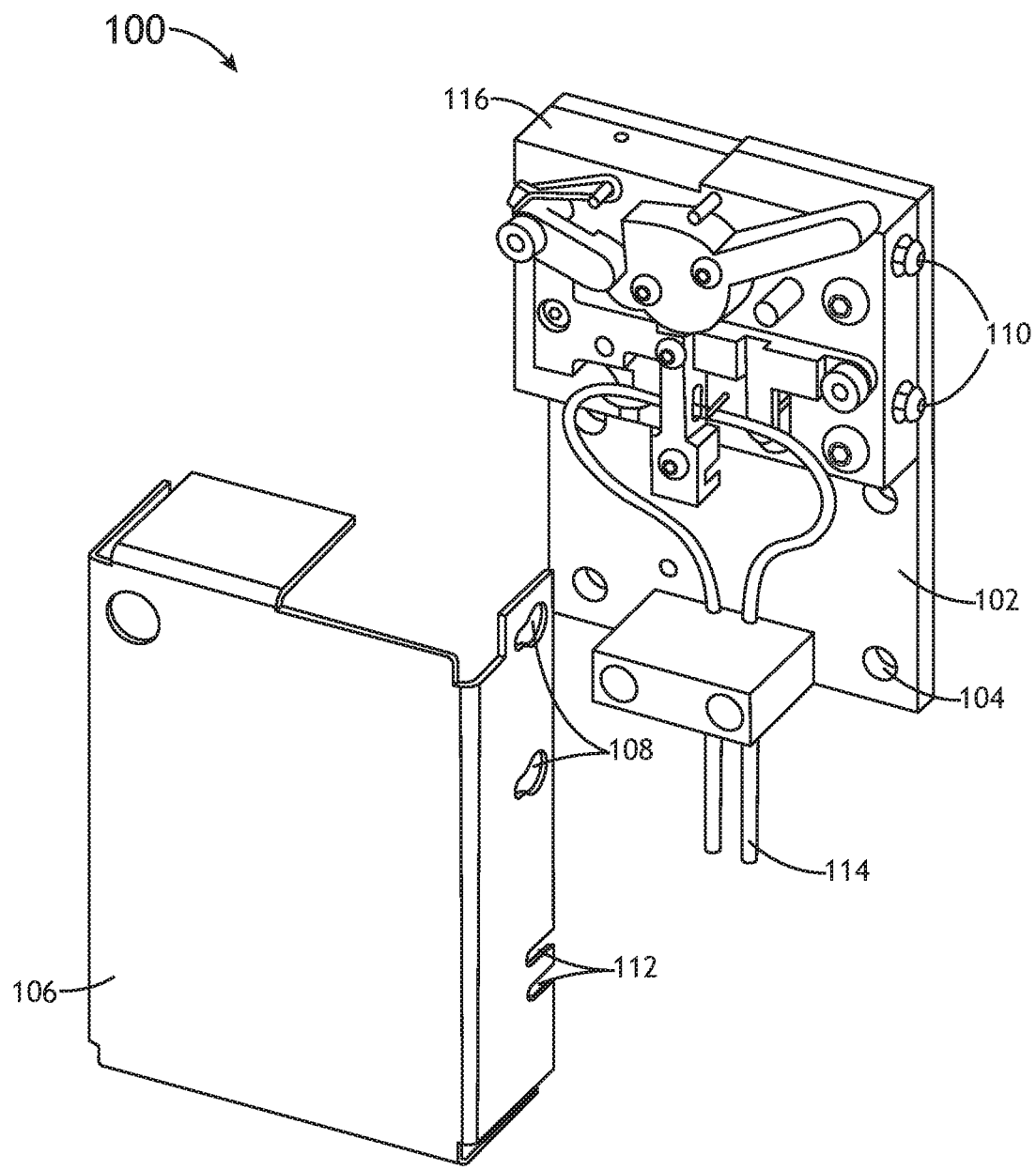
FIG. 1 illustrates a partially unassembled view of the fiber optic tamper switch, in accordance with one or more embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

FIG. 1 illustrates a partially unassembled view of the fiber optic tamper switch 100, in accordance with one or more embodiments of this disclosure. The fiber optic tamper switch 100 may include a switch baseplate 102. The switch baseplate 102 is a flat surface that acts as an attachment surface for the internal components of the fiber optic tamper switch 100. The switch baseplate 102 may also include one or more mounting holes 104 that may be used to attach the fiber optic tamper switch to a flat surface. In some embodiments, the switch baseplate 102 may attach to an adjacent surface by other methods known in the art including but not limited to adhesives or welding.

The fiber optic tamper switch 100 may also include a cover 106. The cover 106 protects the internal components of the fiber optic tamper switch 100. The cover 106 may include keyholes 108 allowing the cover 106 to attach to the base of the fiber optic tamper switch 100 via cover mount screws 110 (e.g., the wide portions of the keyholes 108 fit over the cover mount screws 110, and the cover 106 further slides to allow the cover mount screws 110 to tighten upon the narrow portions of the keyholes 108.) This configuration allows the cover 106 to be removed by loosening, but not removing the cover mount screws 110 entirely, preventing the screws from being lost under nonideal (e.g., dark or wet) conditions. The cover 106 may attach to the switch baseplate 102 of the fiber optic tamper switch 100 by any other means known in the art including but not limited to bolts, screws, adhesives or magnets, therefore the above description should not be interpreted as a limitation of the present disclosure, but merely an illustration.

The cover 106 may also include cover slots 112. The cover slots 112 allow an optical fiber 114 or a fiber optic cable 115 to be threaded into and out of the fiber optic tamper switch 100. The cover slots 112 may be located at any place on the cover 106 where the optical fiber 114 or fiber optic cable 115 may be threaded. For instance, the cover slots 112 may be located on the same surface as the keyholes 108 (e.g., allowing the optical fiber 114 or fiber optic cable 115 to enter and exit from the same cover surface as the keyholes 108). In another instance, the cover slots 112 may be located on another side of the cover 106 (e.g., in FIG. 1, slots 112 may also be located on the bottom portion of the cover (although not visible) allowing the optical cable 115 to pass through).

It should be noted that the cover 106 also acts as an access delay mechanism, as the removal the cover 106 increases the amount of time needed to reset the fiber optic tamper switch 100. An increase in the time needed to reset the fiber optic tamper switch also increases the time interval that the fiber optic tamper switch is in a released position due to an incursion, which also increases the probability that the incursion will be detected.

The fiber optic tamper switch 100 may also include a component subassembly block 116 physically coupled to the switch baseplate 102. The component subassembly block 116 provides a structure on which several components of the fiber optic tamper switch 100 may be assembled. For instance, one or more cover mount screws 110 may be secured into one or more sides of the component subassembly block 116 allowing the cover 106 to attach to the component subassembly block 116 and switch baseplate 102.

Figure 2:
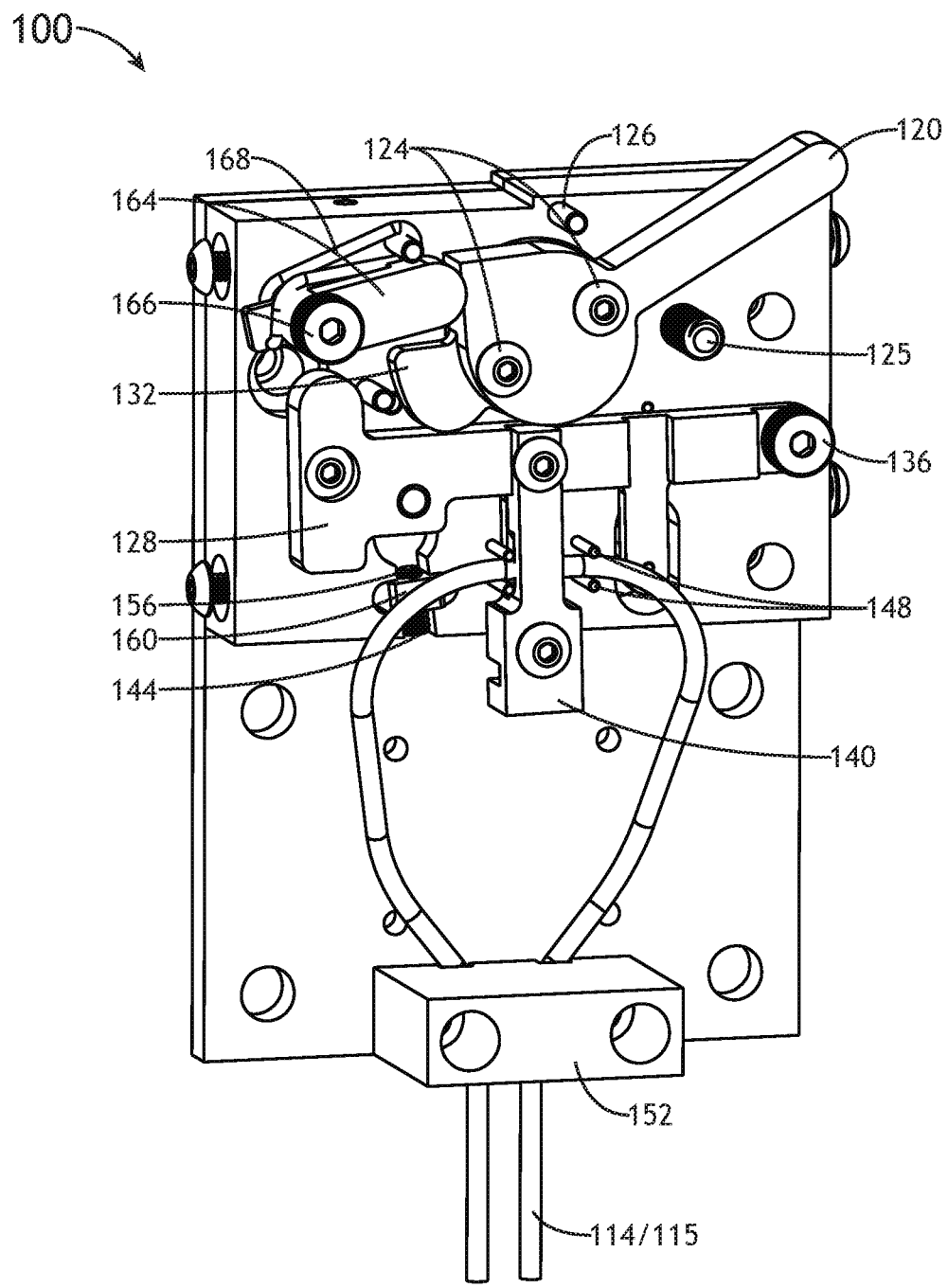
FIG. 2 is a perspective front view of an uncovered fiber optic tamper switch in a cocked position, in accordance with one or more embodiments of this disclosure.

FIG. 2 is a diagram illustrating a perspective front view of an uncovered fiber optic tamper switch 100 in a cocked position, in accordance with one or more embodiments of this disclosure. The cocked position (e.g., default position) is the "set" state of the fiber optic tamper switch 100 (e.g., similar to the set state of a mouse trap).

The fiber optic tamper switch 100 further includes a toggle arm 120 with one end of the toggle arm 120 coupled to a first shaft and/or hub that protrudes from the surface of the component subassembly block 116 (e.g., although not shown, the coupling of the toggle arm 120 to the shaft and/or hub is accomplished through toggle arm screws 124. The coupling of the toggle arm 120 to the shaft and/or hub of the component subassembly block 116 allows the toggle arm 120 to rotate along the axis of the shaft and/or hub that protrudes from the surface of the component subassembly block 116. The toggle arm 120 extends through an open space in the cover 106, where it may make contact with a moveable member (e.g., a door or manhole cover). The toggle arm 120 further includes a cam 132. The cam 132 is configured to transform the rotary motion of the toggle arm 120 into a linear motion. Movement of the toggle arm 120 is limited by either the cover 106 or the component subassembly block 116 if the cover is not present and an uncock stop 126 that prevent the toggle arm 120 from moving past the cocked and uncocked positions, respectively. The cover stop 125 prevents the cover 106 from contacting the moving components of the fiber optic tamper switch 100. The uncock stop 126 is comprised of a pin or dowel that is partially inserted into the component subassembly block 116.

In some embodiments, the fiber optic tamper switch 100 further includes a fiber press bar 128 coupled to the component subassembly block 116 and disposed adjacent to the toggle arm 120. The fiber press bar 128 translates the rotational movement of the toggle arm 120 into a linear-like movement through the interaction of the fiber press bar 128 with the toggle arm 120. The interaction of the fiber press bar 128 with the toggle arm 120 is accentuated by the cam 132 on the toggle arm 120. The fiber press bar 128 is further configured to couple to the component subassembly block 116 via a first shoulder screw 136. The first shoulder screw 136 allows the fiber press bar 128 to rotate along the axis of the shaft of the first shoulder screw 136.

In some embodiments, the fiber optic tamper switch 100 further includes a fiber capture bar 140. One end of the fiber capture bar 140 is coupled to the fiber press bar 128 in a manner configured to allow the fiber capture bar 140 to swing freely from the fiber press bar. For example, the fiber capture bar 140 and the fiber press bar 128 may be coupled by a pin or bolt that is inserted through holes in the fiber capture bar 140 and the fiber press bar 128. The coupling of the fiber capture bar 140 to the fiber press bar 128 further translates the rotational motion of the toggle arm 120 into a linear motion.

The fiber capture bar 140 may further include a fiber guide region 144. The fiber guide region 144 servers to contain and control a portion of the optical fiber 114 or fiber optic cable 115 that is threaded through the fiber optic tamper switch 100. The engagement of the fiber guide region 144 to the optical fiber 114 or fiber optic cable 115 may be implemented by sandwiching the optical fiber 114 or fiber optic cable 115 between the fiber capture bar 140 and the fiber press bar 128. (e.g., one or both of the two components have a recessed area that allow the two components to sandwich the optical fiber 114 or fiber optic cable 115 without crushing or crimping the optical fiber 114 or fiber optic cable). The optical fiber 114 or fiber optic cable 115 may also be attached to or threaded through the fiber guide region 144 by any means known in the art, including but not limited to threading through a hole in the fiber attachment region 144 or placement in a recessed surface in the fiber attachment region 144. Therefore, the above description should not be interpreted as a limitation of the present disclosure, but merely as an illustration.

In some embodiments, the fiber optic tamper switch 100 further includes guide pins 148 coupled to and projecting perpendicular from the component subassembly block 116. The guide pins 148 are disposed adjacent to the fiber guide region 144 of the fiber capture bar 140, where the guide pins 148 are configured to allow the optical fiber 114 or fiber optic cable 115 to be threaded between the guide pins 148. In some embodiments, four guide pins 148 are disposed adjacent to the fiber guide region 144. Alternatively, more than four guide pins 148 may be used. In some embodiments, other methods for securing and guiding the optical fiber 114 or fiber optic cable 115 may be implemented (e.g., clips, harnesses). Therefore, the above description should not be interpreted as a limitation of the present disclosure, but merely as an illustration.

The guide pins 148 are configured to hold the optical fiber 114 or fiber optic cable 115 in a static position. Upon movement of the fiber capture bar 140 (e.g., from the toggle arm 120 acting on the fiber press bar 128), the optical fiber 114 or fiber optic cable 115 will acquire a bend. If the bend in the optical fiber 114 or fiber optic cable 115 is of a small enough radius (e.g., less than 20 mm), then light will leak out (e.g., attenuate or disperse) from the optical fiber 114 or fiber optic cable 115. The light that leaks out of the optical fiber 114 or fiber optic cable 115 can then be monitored and detected. Therefore, an intrusion that results in the moving of a moveable member (e.g., a door or manhole) results in a movement of the toggle arm 120 that ultimately translates into an attenuation or dispersing of light from the optical fiber 114 or fiber optic cable 115. Alternatively, the location of the bend in the optical fiber 114 or fiber optic cable 115 could be detected using optical time-domain reflectometry means.

It is important to point out that the type of optical fiber 114 or fiber optic cable 115 used in the fiber optic tamper switch 100 plays an important role in the proper operation of the fiber optic tamper switch 100. In some embodiments, the fiber type may be single-mode and bend sensitive. Alternatively, the fiber may be multimode and bend sensitive.

In some embodiments, the fiber optic tamper switch 100 further includes a fiber clamp block 152. The fiber clamp block 152 may be coupled to the switch baseplate 102 and/or the component subassembly block 116. The fiber clamp block 152 is configured to stabilize the optical fiber 114 or fiber optic cable 115 within the fiber optic tamper switch 100. For instance, the fiber clamp may be configured to prevent an accidental pulling of the optical fiber 114 or fiber optic cable 115 outside of the fiber optic tamper switch 100 (e.g., outside the slots 112 of the cover 106) from altering the configuration of the optical fiber 114 or fiber optic tamper switch 100 (e.g., causing a narrow-radius bend that would attenuate or disperse the light signal). In some embodiments, the fiber clamp block 152 may be moved to different positions within the fiber optic tamper switch 100. For instance, the position of the fiber clamp block 152 may be determined by the slots 112 in the cover 106 that are used as access points for the optical fiber 114 or fiber optic cable 115.

In some embodiments, the fiber optic tamper switch 100 further includes an adjustment set screw 156 coupled to a recess within the component subassembly block 116. Paired with an adjustment set screw nut 160, the adjustment set screw 156 adjusts the range of movement of the fiber press bar 128 (e.g., the end-face of the adjustment set screw 156 configured to contact the lateral edge or alternate surface/feature of the fiber press bar 128). By adjusting the range of movement of the fiber press bar 128, the adjustment set screw 156 effects an adjustment of the bend incurred on the optical fiber 114 or fiber optic cable 115 when the fiber optic tamper switch 100 is tripped. The method for adjusting the range of movement of the fiber press bar may be accomplished by any method known in that art for adjusting the movement of a bar (e.g., and adjustable clamp or wire). Therefore, the above description should not be interpreted as a limitation of the present disclosure, but merely as an illustration.

In some embodiments, the fiber optic tamper switch 100 includes a locking arm with boss 164. The locking arm with boss 164 locks the toggle arm 120 in a cocked position when the fiber optic tamper switch 100 is being set. The locking arm with boss 164 is coupled to the component subassembly block 116 via a second shoulder screw 166, allowing the locking arm with boss 164 to rotate along a central axis of the second shoulder screw 166. Tension is applied to the locking arm with boss 164 via a locking arm spring 168. The tension applied by the locking arm spring 168 forces a clockwise rotation of the locking arm with boss 164 when the toggle arm 120 is uncocked (e.g., the locking arm with boss 164 holds the toggle arm 120 in place during the cocking procedure; once the toggle arm is further pushed into a cocked, or triggered, position by a moveable member (e.g., a door) the locking arm with boss 164 freely rotates away from the toggle arm 120, leaving the optical fiber tamper switch 100 ready to detect any future changes in position of the moveable member). The locking arm spring 168 may be any type of elastic material that apply tension to the locking arm with boss 164 including but not limited to a wire spring, a rubber band, or an O-ring. The locking arm spring 168 is attached to one end to the locking arm with boss, and on another end to a pin attached to the component subassembly block 116.

Figure 3:
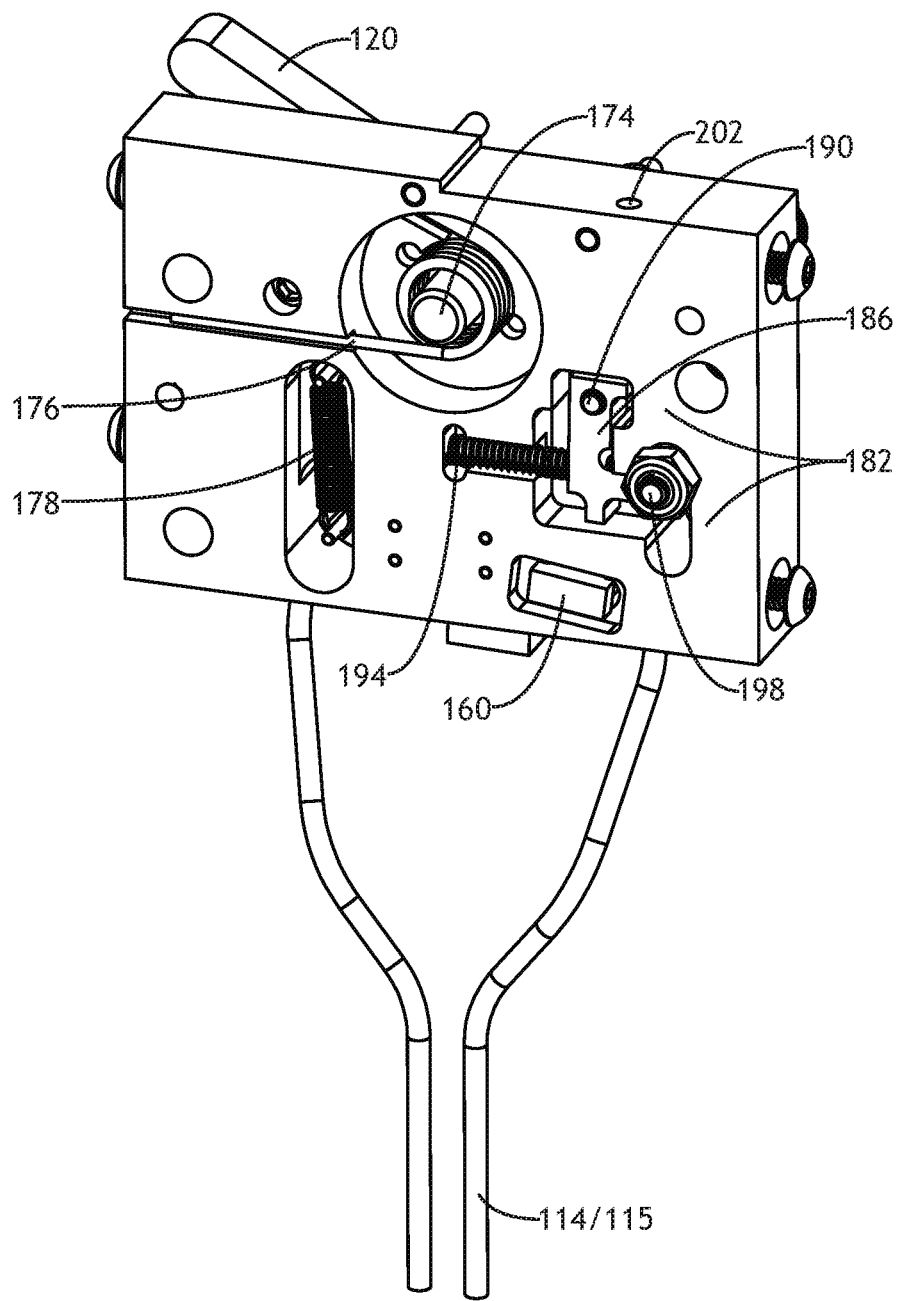
FIG. 3 is a perspective rear view of an uncovered fiber optic tamper switch in a cocked position with the switch baseplate 102 removed, in accordance with one or more embodiments of this disclosure.

FIG. 3 is a diagram illustrating a perspective rear view of an uncovered fiber optic tamper switch 100 in a cocked position with the switch baseplate 102 removed, in accordance with one or more embodiments of this disclosure.

In some embodiments, the fiber optic tamper switch 100 further includes a toggle arm tension spring assembly 174. The toggle arm tension spring assembly 174 provides tension force to the toggle arm 120 when the fiber optic tamper switch 100 is triggered, forcing the toggle arm 120 towards and/or against the uncock stop 126. The toggle arm tension spring assembly 174 is attached and assembled within the component subassembly block 116, where it is coupled to the toggle arm 120. The tension force provided by the toggle arm tension spring assembly 174 is generated from a toggle arm spring 176. In some embodiments the tension force provided by the toggle arm tension spring assembly 174 may be generated by a rubber band, a tension rod, or other tension generating element. Therefore, the above description should not be interpreted as a limitation to the present disclosure, but merely an illustration.

In some embodiments, the fiber optic tamper switch 100 further includes a fiber press bar spring 178. The fiber press bar spring 178 provides tension to the fiber press bar 128, forcing the fiber press bar into contact the toggle bar 120. The fiber press bar spring 178 is coupled to the fiber press bar 128 at one end, and attached to the component subassembly block 116 at another end. The fiber press bar spring may be constructed of any material known in the art to supply a tension force including but not limited to a metal spring, a rubber band, or a tension rod.

In some embodiments, the fiber optic tamper switch 100 includes a latch assembly 182. The latch assembly 182 traps the fiber press bar 128 in an uncocked position once the fiber optic tamper switch 100 is triggered. The latching mechanism 182 also prevents the fiber capture bar 140 from reversing the bend in the optical fiber 114 or fiber optic cable 115 if the toggle bar 120 has been moved from an uncocked position to a cocked position.

The latch assembly 182 includes a toggle lock 186. The toggle lock 186 is configured to rotate on a toggle lock dowel pin 190 that has been partially inserted into the component subassembly block 116. The latch assembly 182 further includes a compression spring 194. The compression spring 194 is disposed into a recess within the component subassembly block 116. One end of the compression spring 194 is disposed adjacent to an interior surface of the component subassembly block 116. The other end of the compression spring 194 is disposed adjacent to the toggle lock 186. The compression spring 194 places a constant force upon the toggle lock 186. The latch assembly 182 further includes a locking screw 196. The locking screw 196 is attached to the fiber press bar 128 on one end. The locking screw 196 traverses through the component subassembly block 116, where is it capped off by a nut. However, the locking screw may be capped off by any other type of element capable of capping of a screw (e.g., a cotter pin). When the fiber press bar 128 is moved, the locking bar 128 is configured to move freely within the opening provided in the component subassembly block 116. When the fiber optic tamper switch 100 is in the cocked position, the compression spring 194 forces an extended segment of the toggle lock 186 into a position beneath the locking screw 196. When the fiber optic tamper switch 100 is triggered, the fiber press bar is moved (e.g., as in a downward motion in FIGS. 2 and 3. The locking screw 196 moves along with the fiber press bar 128 until it contacts and rotates the toggle lock 186 on the toggle lock dowel pin 190 and then slips past the spring-loaded toggle lock. The toggle lock 186, compressed by the compression spring 194, engages, capturing the locking screw 196 into a locked position and locking the fiber press bar 128 fiber capture bar 140 into the uncocked position.

The latch assembly 182 also includes a lock reset cavity 197. The lock reset cavity 197 is configured to be a hole drilled from a side of the component assembly block (e.g., the top side in FIG. 3) to the cavity formed for the toggle lock 186. The lock reset cavity 197 is further configured so that a slender tool (e.g., a bar, a stick, a hex wrench, or a nail) may be inserted through the lock reset cavity 197 and pressed against the toggle lock 186. Pressure on the toggle lock 186 by the tool inserted into the lock reset cavity 197 releases the toggle lock 186 from the locking screw 196, allowing the locking screw 196 and the fiber press bar 128 to move back into the cocked position. The resetting of toggle lock can be performed quickly, allowing the fiber optic tamper switch to readily configure between a locking mode and a non-locking mode.

Figure 4:
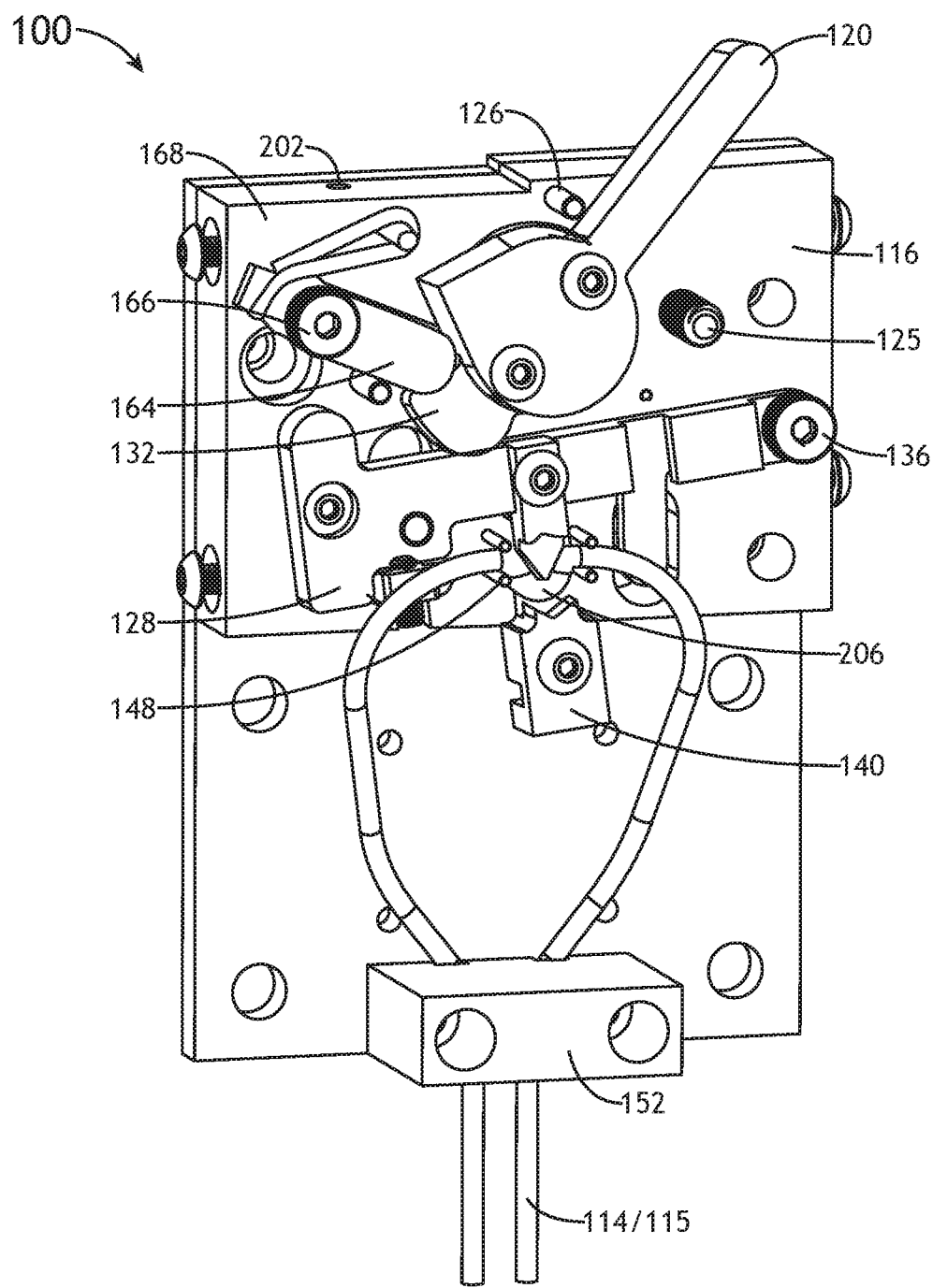
FIG. 4 is a perspective front view of an uncovered fiber optic tamper switch in an uncocked position, in accordance with one or more embodiments of this disclosure.

FIG. 4 is a diagram illustrating perspective front view of an uncovered fiber optic tamper switch 100 in an uncocked position, in accordance with one or more embodiments of this disclosure. The uncocked position (e.g., discharged position) is the "triggered" state of the fiber optic tamper switch 100 (e.g., similar to triggering a mouse trap). A section of the fiber capture bar 140 has been removed in order to show a microbend 198 in the fiber optic cable 115.

In some embodiments, during a triggering event (e.g., a door or lid is moved from the toggle bar 120) the toggle bar 120, under tension from the toggle arm tension spring assembly 174, moves from a cocked position (e.g., adjacent to either the cover 106 or the top surface of the component assembly block 116) to the uncocked position (e.g., adjacent to the uncock stop 126). The rotation of the toggle arm 120 forces the cam 132 of the toggle arm 120 to press upon the fiber press bar 128. The fiber press bar 128 then rotates upon a first shoulder screw 136 and drives the coupled fiber capture bar 140 in between the four guide pins 148. An optical fiber 114 or fiber optic cable 115 that is laced between the guide pins and coupled to the coupled fiber capture bar 140 undergoes a flexure stress when the fiber capture bar 140 is moved through the guide pins 148, creating a microbend 198 in the optical fiber 114 or fiber optic cable 115. The microbend 198 may cause attenuation or dispersion of a light signal traveling through the optical fiber or fiber optic cable, which may be detected.

In some embodiments, rotation of the fiber press bar 128 (e.g., when the fiber optic tamper switch 100 is triggered) moves the locking screw 196 (e.g., coupled to the fiber press bar 128) through a space within the component subassembly block 116, where it is locked into position by the toggle lock 186.

In some embodiments, the cocking of the fiber optic tamper switch 100 requires the simultaneous, or near simultaneous, rotation of the locking arm with boss 164 (e.g., counterclockwise along the second shoulder screw 166 as in FIG. 2) and the toggle arm 120 (e.g., clockwise towards the top of the cover 106 or the top surface of the component assembly block 116) into a position where the contact between the locking arm with boss 164 and the toggle bar 120 and the tension applied by the locking arm spring 168 and the toggle arm tension spring assembly 174 may lock the toggle arm 120 into a cocked position. Once the toggle arm 120 is cocked (the fiber optic tamper switch 100 is then armed by pushing the fiber optic tamper switch (e.g., by closing a door) further towards and/or in contact with the top surface of the cover 106 or the top surface of the component assembly block 116. Pushing the toggle arm 120 further towards and or in contact with the top surface of the cover 106 or the top surface of the component assembly block 116 causes the toggle arm 120 and the locking arm with boss 164 to lose contact, and the locking arm with boss 164 swings away from the toggle arm 120. Once the locking arm with boss 164 swings away from the toggle arm 120, the toggle arm 120 remains in a set, or armed, position, allowing the toggle arm 120 to swing freely to the uncocked position when the door is opened.

In some embodiments, the cocking of the fiber optic tamper switch 100 further requires the unlocking of the latching mechanism 182. As mentioned above, unlocking the latching mechanism 182 requires the insertion of a slender tool (e.g., a bar, a stick, a hex wrench, or a nail) into the lock reset cavity 197, where it instrument presses upon the toggle lock 186, releasing the toggle lock 186 from the locking screw 196.

Once the latching mechanism 182 is unlocked, tension from the fiber press bar spring 178 forces the fiber press bar 128 to rotate towards the cocked toggle bar 120. The fiber capture bar 140 that is coupled to the fiber press bar 128 also moves back to the cocked position. The movement of the fiber capture bar 128 to the cocked position removes the microbend 198 from the optical fiber 114 or fiber optic cable 115, removing the attenuation or dispersion of the light signal through the optical fiber 114 or fiber optic cable 115 that occurred when the microbend 198 was present.

It should be noted that the fiber optic tamper switch 100 may be designed for harsh environments. For instance, the fiber optic tamper switch 100 may be resistant to caustic situations (e.g., exposure to salt water or fertilizer). The fiber optic tamper switch may also be capable of operating within a wide temperature range (e.g., from −46° C. to 85° C.). The fiber optic tamper switch 100 may also be designed to be operated under submerged and/or waterlogged conditions. For instance, the fiber optic tamper switch 100 may be operational at depths of 30 feet. In another instance, the fiber optic tamper switch 100 may be operational at depths over 30 feet.

Figure 5A:
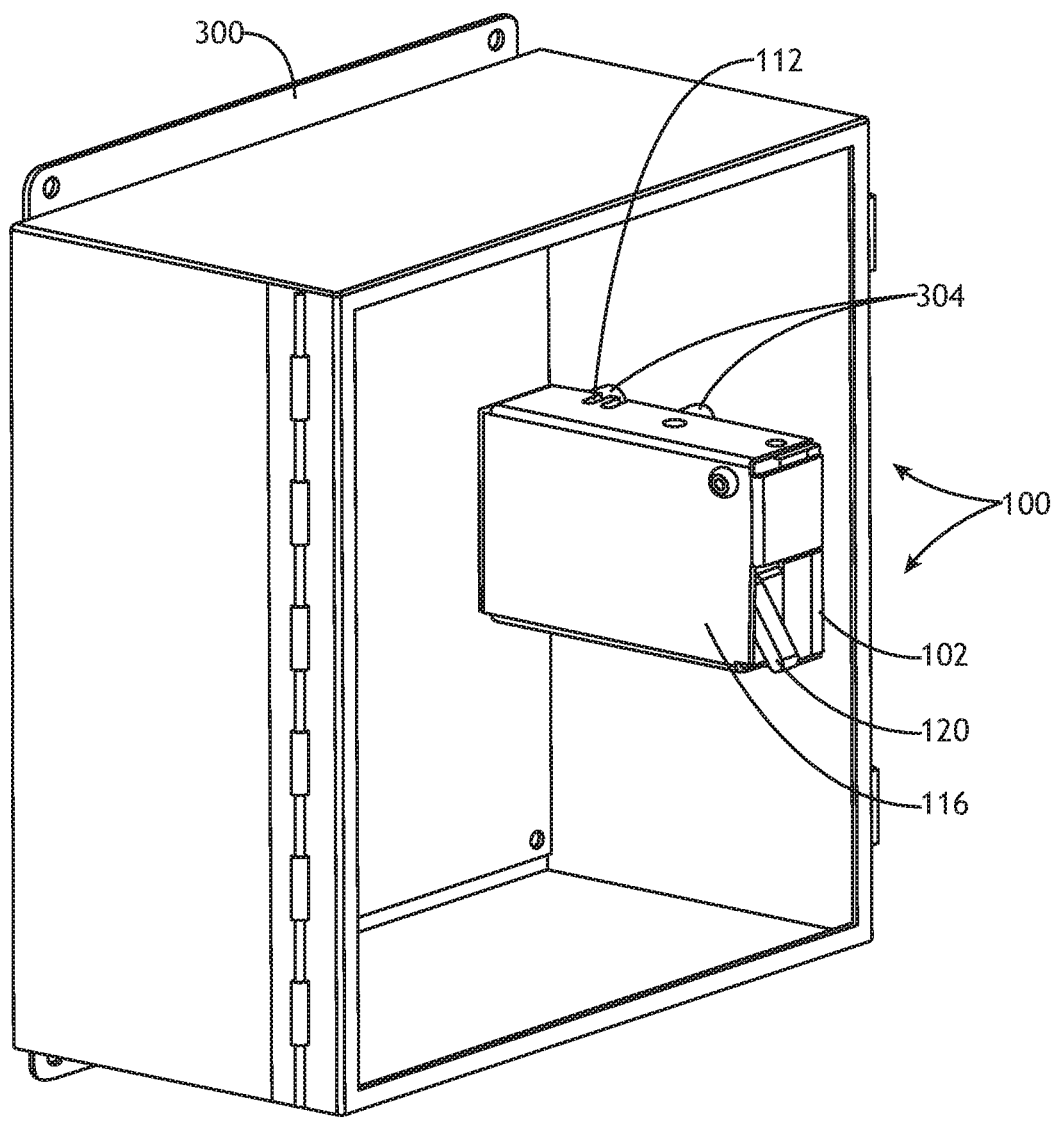
FIG. 5A illustrates an example implementation of an optical fiber tamper switch configured to detect the movement of a moveable member, in accordance with one or more embodiments of this disclosure.

FIG. 5A is a diagram illustrating an example implementation of an optical fiber tamper switch 100 configured to detect the movement of a moveable member, in accordance with one or more embodiments of this disclosure. The moveable member may be any type of object that would allow an intrusion to occur including but not limited to a manhole cover, a door, a lid or a panel. In some embodiments the moveable member is a door to a box 300.

In some embodiments, the fiber optic tamper switch 100 may be attached to the box 300 in a manner that places the door in direct contact with the toggle arm 120 of the fiber optic tamper switch 100 (in FIG. 5A, the door has been removed for clarity). The fiber optic tamper switch 100 may be configured to attach to a side of the box 300 through a set of screws that couple the side of the box 300 to the switch baseplate 102. Spacers 304 may be placed between the fiber optic tamper switch 100 and the attachment side to the box 300 to allow for clearance (e.g., to ensure that the toggle arm 120 can rotate move freely once the door is opened) and to ensure proper function of the fiber optic tamper switch 100.

The installation of the fiber optic tamper switch 100 may be further configured to allow the optical fiber 114 or fiber optic cable 115 to be threaded through the cover slots 112. The cover 106 may be further configured to have more than one sets of cover slots 112 in the event that one set of the cover slots 112 is blocked (e.g., by the cover abutting one or more surfaces of the box 300). Care should be taken when routing the optical fiber 114 or fiber optic cable 115 do avoid bending the fiber (e.g., with a radius of less than 0.5 inches (1.27 cm)) to prevent attenuation or dispersion of the light signal.

The installation of the fiber optic tamper switch 100 may be further configured to allow access of the cover mount screws 110. The cover mount screws 110 are configured to attach the cover 106 to the fiber optic tamper switch via keyholes 108 in the cover 106. The coupling to the cover to the fiber optic tamper switch may be further configured to allow the removal of the cover by loosening the cover mount screws 110 that were tightened on the slot of the keyholes. Once the cover mount screws 110 are loosened, the cover is moved, allowing the larger opening of the keyhole to align with the smaller diameter of the heads of the cover mount screw 110. Then the cover mount screws 110 can be tightened into the body of the component assembly block 116, allowing removal of the cover.

The installation of the fiber optic tamper switch may be further configured prevent the switch from being reset too quickly by an intruder to avoid detection (e.g., less than ten seconds), but still allow a relatively quick reset by an authorized person (e.g., between ten seconds to a minute). For instance, to reset an installed optical fiber tamper switch 100, an unauthorized person that triggers the fiber optic tamper switch may need to loosen four cover mount screws 110, remove the cover 106, rotate the toggle arm 120 and locking arm with boss 164 to cock the toggle arm 120, and insert an instrument into the lock reset cavity 197 to unlock the toggle lock 186 within 10 seconds. Under ideal circumstances (e.g., well-lit conditions and having the correct tools), a trained person would have difficulty resetting the fiber optic tamper switch 100 within that amount of time, whereas a trained authorized person may be able to perform the same task within a minute. Therefore, the fiber optic tamper switch 100 may frustrate an unauthorized user's attempts to quickly reset the fiber optic tamper switch 100 to avoid detection while not frustrating an authorized user's attempt to reset the fiber optic tamper switch 100 in a relatively short amount of time. It should be noted that the range of time required for detection of a signal and reset by an authorized person is dependent on the detection technology and the skill of the authorized person. Therefore, the above description should not be interpreted as a limitation to the present disclosure, but merely an illustration.

Figure 5B:
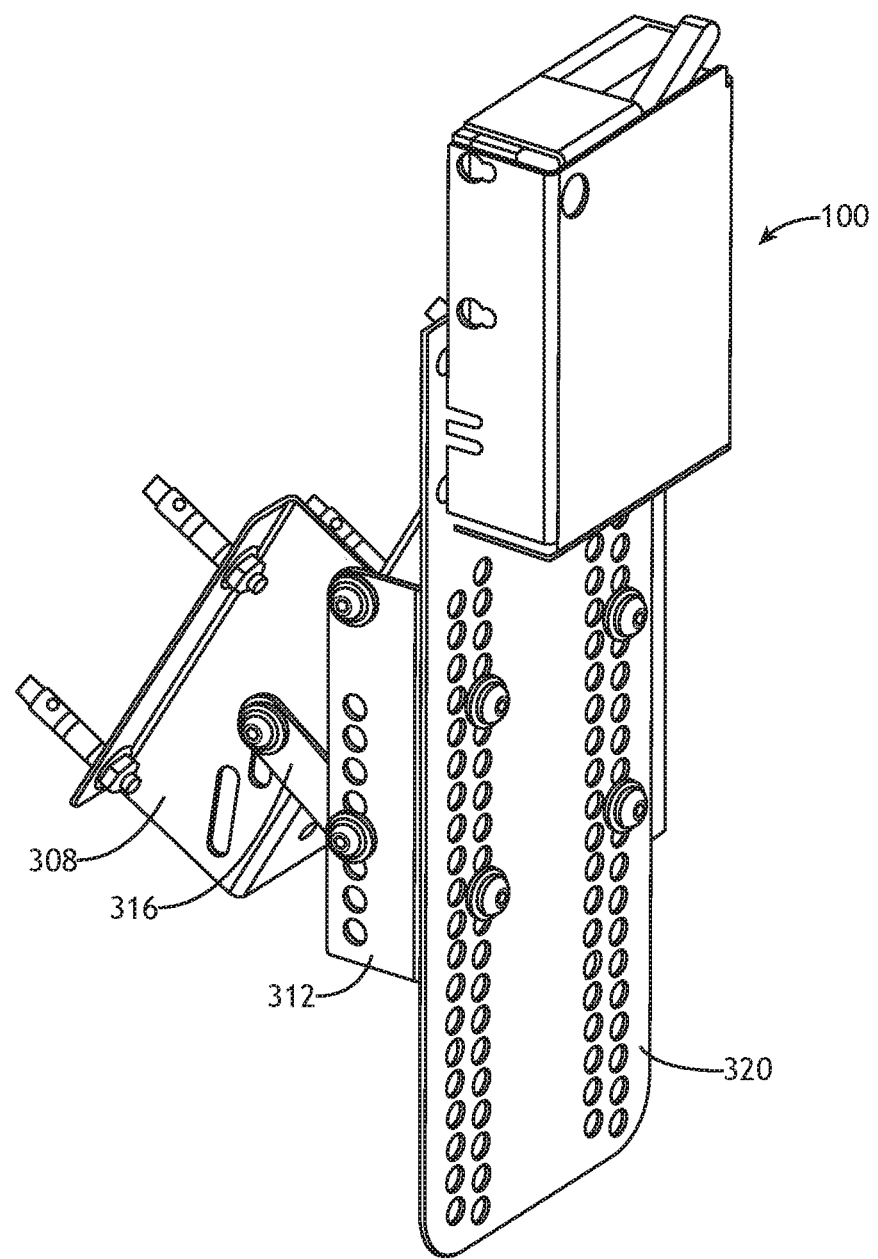
FIG. 5B illustrates an example implementation of an optical fiber tamper switch, in accordance with one or more embodiments of this disclosure.

FIG. 5B is a diagram illustrating an example implementation of an optical fiber tamper switch 100, in accordance with one or more embodiments of this disclosure.

The fiber optic tamper switch 100 may further include a mounting bracket 308. The mounting bracket 308 enables the coupling of the fiber optic tamper switch 100 to surfaces where it would be difficult to directly attach the fiber optic tamper switch 100. For instance, a mounting bracket 308 may be configured to attach to the curved area of a manhole shaft (e.g., through a set of expansion bolts). The fiber optic tamper switch 100 may then attach to the mounting bracket 308 using screws normally used to attach the fiber optic tamper switch 100 directly to the surface.

The fiber optic tamper switch 100 may further include an angle adapter 312. The angle adapter 312 adjusts the angle between the fiber optic tamper switch attachment face of mounting bracket 308 and the switch baseplate 102 of the fiber optic tamper switch 100. The angle adapter 312 may be used under circumstances where the moveable member is not aligned with the toggle arm 120 of the fiber optic tamper switch 100. For instance, the angle adapter 312 may be used for a manhole application where the manhole cover lies flat on the ground, while the manhole shaft descends at an angle. The angle adapter 312 may be further configured to attach to the mounting bracket 308 via a set of screws and an adjustment bar 316. The adjustment bar 316 is configured to allow attachment of the angle adapter 312 to the mounting bracket 308 at multiple points along the angle adapter 312 and the mounting bracket 308, allowing the angle adapter 312 to attain a wide range of angle adjustment (e.g., greater than 30 degrees). The angle adapter 312 then may attach to the fiber optic tamper switch 100 using screws normally used to attach the fiber optic tamper switch 100 directly to the surface.

The fiber optic tamper switch 100 may further include a bracket extender 320. The bracket extender is a flat plate with several holes that may be used to couple the fiber optic tamper switch 100 to the mounting bracket 308 and/or the angle adapter 312. The bracket extender 320 may be configured to allow the fiber optic tamper switch 100 to operate a distance (e.g., 2 to 30 cm) from the mounting bracket 308 and/or the angle adapter 312. Multiple bracket extenders 320 may be further configured to extend the distance between the fiber optic tamper switch 100 and the mounting bracket 308. Alternatively, multiple bracket extenders 320 may be further configured to extend in both an 'X' and 'Y' direction (e.g., a "T" formation) allowing the fiber optic tamper switch 100 to be installed anywhere within the plane of the bracket extender 320. The fiber optic tamper switch may also be further configured to include spacers 304 that may be placed between the bracket extender 320 and the mounting bracket 308 and/or the angle adapter 312. The combination of the bracket extenders 320 and the spacers 304 may be configured to allow the installation of the fiber optic tamper switch 100 at several positions within a three-dimensional space.

It should be known that the mounting bracket 308 may further include an angle adapter 312, a bracket extender 320 and/or spacers 304. Therefore, the above description should not be interpreted as a limitation of the present disclosure, but merely an illustration.

The fiber optic tamper switch 100 may further include a target plate (although not shown). The target plate attaches to the moveable member, creating an easily assessable target for the toggle arm 120 to press against. For instance, a target plate may be attached to a manhole cover, a security pan of a manhole, or a door. The target plate may then contact the toggle arm 120 in the cocked position, and trigger the fiber optic tamper switch 100 if the target plate is moved.

It is noted herein that the orientation and/or the dimensions of the various components and cavities illustrated in FIGS. 1A through 5 are not intended to be limiting to the fiber optic tamper switch 100. In this regard, the various components and cavities may include different dimensions and/or be differently oriented within the fiber optic tamper switch 100 than as illustrated in FIGS. 1A through 5. Therefore, the above description should not be interpreted as a limitation on the disclosure but merely an illustration.

Figure 6:
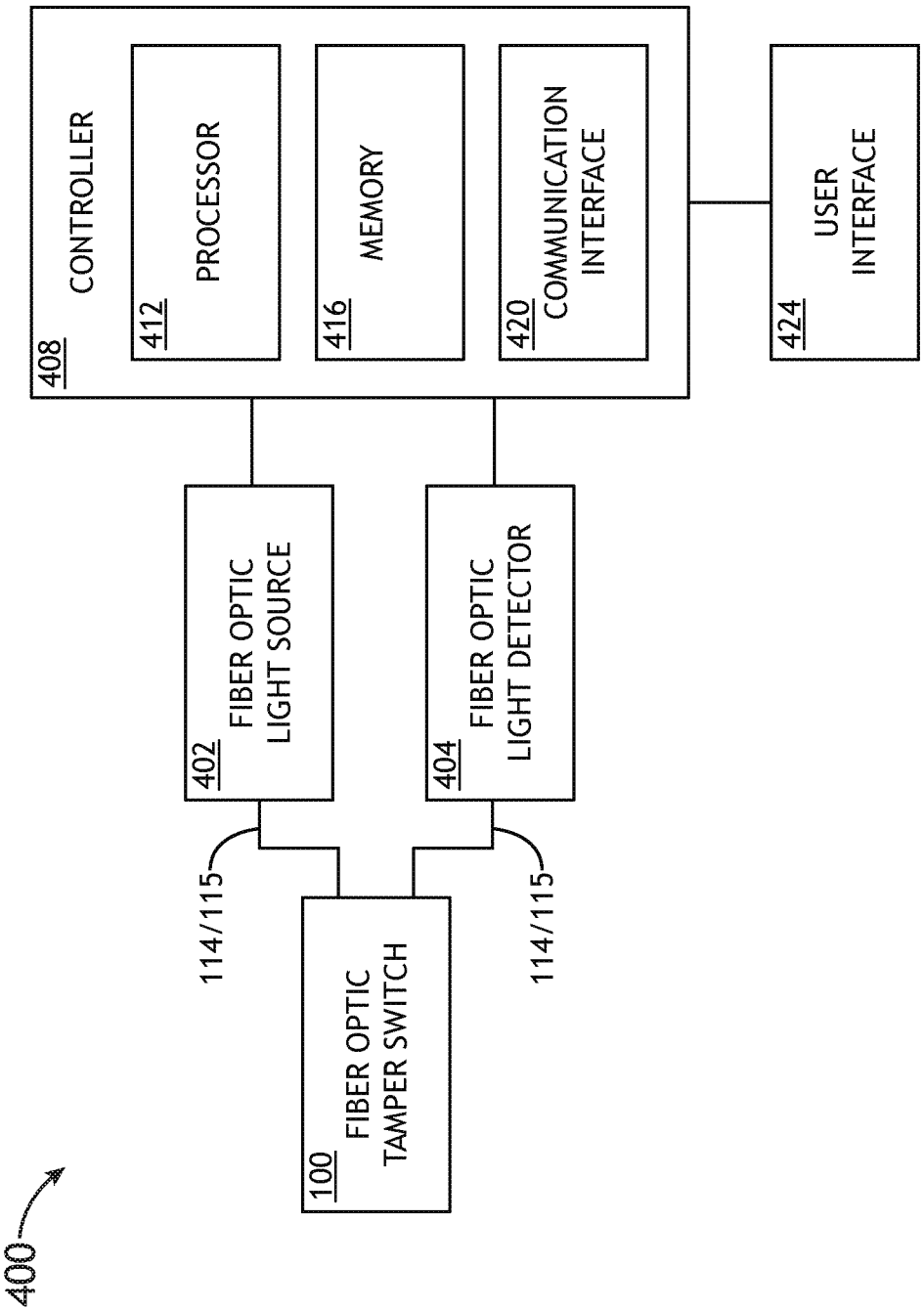
FIG. 6 is a block diagram illustrating an example implementation of an optical fiber tamper switch system, in accordance with one or more embodiments of this disclosure.

FIG. 6 is a block diagram illustrating an example implementation of an optical fiber tamper switch system 400, in accordance with one or more embodiments of this disclosure. The optical fiber tamper switch system 400 allows the remote detection of a movement of a moveable member (e.g., a door) and reporting the detection to a user.

The optical fiber tamper switch system 400 includes a fiber optic tamper switch 100. As described herein, the fiber optic tamper switch 100 is activated upon the movement of a moveable member from the toggle arm 120 of the fiber optic tamper switch 100. The fiber optic tamper switch system 400 may have any number of fiber optic tamper switches 100 depending on the arrangement of fiber optic tamper switches 100 and optical fibers 114 or fiber optic cables 115. For instance, more than 20 fiber optic tamper switches 100 may be installed one a single optical fiber 114 or fiber optic cable, and multiple optical fibers 114 or fiber optic cables 115 may be installed in an optical fiber tamper switch system 400. In another instance, more than one optical fiber 114 or more than one fiber optic cable 115 may be installed in a single optical fiber tamper switch 100. In some embodiments the fiber optic tamper switch system 400 includes one fiber optic tamper switch 100. In some embodiments the fiber optic tamper switch system 400 includes between one and 30 fiber optic tamper switches 100. In some embodiments the fiber optic tamper switch system includes between 25 and 10,000 fiber optic tamper switches.

The optical fiber tamper switch system 400 further includes optical fiber 114 and/or fiber optic cable 115. The optical fiber and/or fiber optic cable 115 acts as a waveguide for the optical signal sent through the optical fiber transfer switch system 400. In some embodiments, the fiber optic cable 115, containing one or more optical fibers 114, is threaded through the fiber optic tamper switch 100. In some embodiments, one or more optical fibers 114 are separated from the fiber optic cable 115 (e.g., using a junction box), and one or more of the separated optical fibers 114 are threaded through the fiber optical tamper switch 100. The optical fiber 114 or fiber optic cable 115 may be further configured to be bend sensitive, allowing the light signal to attenuate or disperse upon the generation of a small curve (e.g., a radius of less than 0.75 inches (1.9 cm) within the optical fiber 114 or fiber optic cable 115.

In some embodiments, the optical fiber 114 and/or fiber optic cable 115 may be further configured to be single mode. Alternatively, the optical fiber 114 and/or fiber optic cable may be further configured to be multimode. In some embodiments, the optical fiber 114 and/or fiber optical cable 115 are capable of transmitting an optic signal between 850 and 1800 nm. In some embodiments, the optical fiber 114 and/or fiber optical cable 115 are capable of transmitting an optic signal between 1200 and 1600 nm. In some embodiments, the optical fiber 114 and/or fiber optical cable 115 are capable of transmitting an optic signal of approximately 1550 nm. In some embodiments, the optical fiber 114 are capable of transmitting an optic signal of approximately 1310 nm. In embodiments, the optical fiber 114 are capable of transmitting an optic signal of approximately 850 nm.

It is noted that the fiber optic tamper switch 100 and the fiber optic tamper system 400 allow the installation of a fiber optic cable 115 without having to splice any optical fiber 114 or fiber optic cable 115. The reduction of the need for splicing reduces the labor and costs of splicing fiber optic cable, particularly for submerged and/or waterlogged conditions. The reduction of splicing also increases the length that an optical signal can be competently transmitted along the optical fiber 114 or fiber optic cable 115.

The fiber optic tamper switch system 400 may further include a fiber optic light source 402. The fiber optic light source 402 generates the light signal that is transmitted through the optical fiber 114 or the fiber optic cable 115. The fiber optic light source 402 may be any light source known in the art capable of generating a light signal in an optical fiber 114 or fiber optic cable 115 including but not limited to a laser or light emitting diode (LED).

The fiber optic tamper switch system 400 also includes a fiber optic light detector 404. The fiber optic light detector 404 detects the light signal coming from the optical fiber 114 or fiber optic cable 115. The fiber optic light detector 404 may be any detector known in the art to detect light from an optical fiber 114 or fiber optic cable 115.

The fiber optic tamper switch system 400 further includes a controller 408. The controller 408 is configured to be communicatively coupled to the fiber optic light source 402 and the fiber optic light detector 404. The controller 408 is configured to determine a set of parameters for sending a fiber optic signal through the fiber optic light source 402. For instance, the controller 408 may control the light signal broadcast through the optical fiber 114 or fiber optic cable 115. The controller 408 is further configured to receiving signal data from the fiber optic light detector 404 to determine whether a fiber optic tamper switch 100 has been triggered based on the differences between the signal sent by the fiber optic light source 402 and the signal received by the fiber optic light detector 404. In some embodiments, the controller 408 may further determine the position of a triggered fiber optic tamper switch 100 using optical time-domain reflectometry (OTDR). OTDR is a method for measuring the reflected light from an optical fiber over time. OTDR allows the measurements and characteristics of the light signal to be integrated as a function of time, which then allows the fiber length (e.g., length of fiber to a triggered fiber optic tamper switch 100) to be identified. In some embodiments, the fiber optic tamper switch system 400 is capable of detecting an intrusion event within one second. In some embodiments, the fiber optic tamper switch system is capable of detecting an intrusion event and identifying the relative location of the intrusion event within 10 seconds. In some embodiments, the fiber optic tamper switch system is configured to determine that an attenuation or dispersion of at least one of the optical fiber or the fiber optic cable has occurred without reporting specific location identification.

In some embodiments, the optical fiber 114 or fiber optic cable 115 are arranged as a single loop. For instance, a fiber optic cable 115 containing one or more optical fibers 114 is arranged in a loop and routed through one or more fiber optic tamper switches (e.g., as an intact cable or as individual optical fibers 114 using splice junctions). In some embodiments, the optical fiber 114 or fiber optic cable 115 are arranged as a single non-looped line, where the light signal is sent and received through one end, as the signal is reflected at the other end of the fiber (e.g., the fiber optic light source 402 and the fiber optic light detector 404 are combined into a single entity). A single optical line may be used in OTDR methodology. It should be noted that the fiber optic tamper switch system 400 is capable of transmitting a light signal along long distance (e.g., 20 to 25 km) while still being capable of detecting an intrusion. In some embodiments, the fiber optic tamper switch system is capable of transmitting a light signal over 25 km.

The controller 408 is configured to include at least one processor 412, memory 416, and communication interface 424. The processor 412 is configured to provide processing functionality for at least the controller 408 and can include any number of processors, micro-controllers, circuitry, field programmable gate array (FPGA) or other processing systems, and resident or external memory for storing data, executable code, and other information accessed or generated by the controller 408. The processor 412 is configured to execute one or more software programs embodied in a non-transitory computer readable medium (e.g., memory 416) that implement techniques described herein. The processor 412 is not limited by the materials from which it is formed or the processing mechanisms employed therein and, as such, can be implemented via semiconductor(s) and/or transistors (e.g., using electronic integrated circuit (IC) components), and so forth. In some embodiments, the controller 408 may utilize analog control logic only in the processor 412 function so as to enhance cyber security considerations.

The memory 416 can be an example of tangible, computer-readable storage medium that provides storage functionality to store various data and/or program code associated with operation of the controller 408/processor 412, such as software programs and/or code segments, or other data to instruct the processor 412, and possibly other components of the controller 408, to perform the functionality described herein. Thus, the memory 416 can store data, such as a program of instructions for operating the controller 408, including its components (e.g., processor 412, communication interface 420, etc.), and so forth. It should be noted that while a single memory 416 is described, a wide variety of types and combinations of memory (e.g., tangible, non-transitory memory) can be employed. The memory 416 can be integral with the processor 412, can comprise stand-alone memory, or can be a combination of both. Some examples of the memory 416 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 420 can be operatively configured to communicate with components of the controller 408. For example, the communication interface 420 can be configured to retrieve data from the processor 412 or other devices (e.g., fiber optic light source 402, fiber optic light detector 404, etc.), transmit data for storage in the memory 416, retrieve data from storage in the memory 416, and so forth. The communication interface 420 can also be communicatively coupled with the processor 412 to facilitate data transfer between components of the controller 408 and the processor 412. It should be noted that while the communication interface 424 is described as a component of the controller 408, one or more components of the communication interface 424 can be implemented as external components communicatively coupled to the controller 408 via a wired and/or wireless connection. The controller 408 can also include and/or connect to one or more input/output (I/O) devices. In embodiments, the communication interface 424 includes or is coupled to a transmitter, receiver, transceiver, physical connection interface, or any combination thereof.

In some embodiments, the fiber optic tamper switch system 400 includes a user interface 424. In some embodiments, the user interface is communicatively coupled to the one or more processors 412 of controller 408. In some embodiments, the user interface 424 may be utilized by controller 408 to accept selections and/or instructions from a user. In some embodiments, described further herein, a display may be used to display data to a user. In turn, a user may input selection and/or instructions responsive to data displayed (e.g., inspection images) to the user via the user interface 424.

The user interface 424 may include any user interface 424 known in the art. For example, the user interface 424 may include, but is not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel mounted input device or the like. In the case of a touchscreen interface device, those skilled in the art should recognize that a large number of touchscreen interface devices may be suitable for implementation in the present invention. For instance, the display device may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present invention.

The display device may include any display device known in the art. In one embodiment, the display device may include, but is not limited to, a liquid crystal display (LCD). In another embodiment, the display device may include, but is not limited to, an organic light-emitting diode (OLED) based display. In another embodiment, the display device may include, but is not limited to a CRT display. Those skilled in the art should recognize that a variety of display devices may be suitable for implementation in the present invention and the particular choice of display device may depend on a variety of factors, including, but not limited to, form factor, cost, and the like. In a general sense, any display device capable of integration with a user interface device (e.g., touchscreen, bezel mounted interface, keyboard, mouse, trackpad, and the like) is suitable for implementation in the present invention.

In some embodiments, the fiber optic light source 402, fiber optic light detector 404, controller 408 and user interface 424 components of the fiber optic tamper switch enclosed within a single unit. In some embodiments, all components of the fiber optic tamper switch system 400 exist as separate, individual units. Alternatively, the fiber optic tamper switch system 400 may include a both individualized components (e.g., a stand-alone fiber optic source) and components enclosed as a unit.

Figure 7:
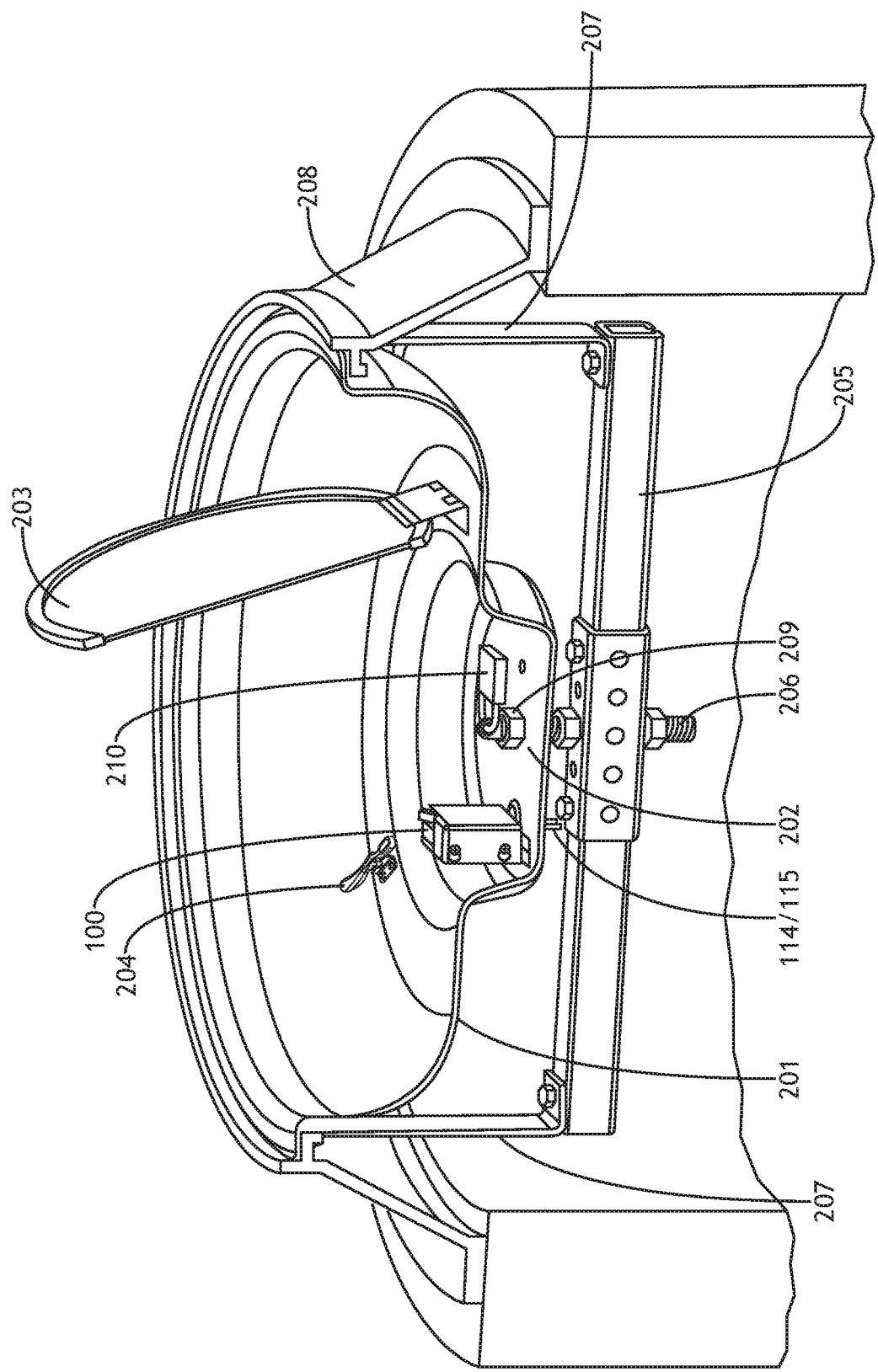
FIG. 7 is a cutaway view of a fiber optic tamper switch integrated into a manhole security pan, in accordance with one or more embodiments of this disclosure.
Figure 8:
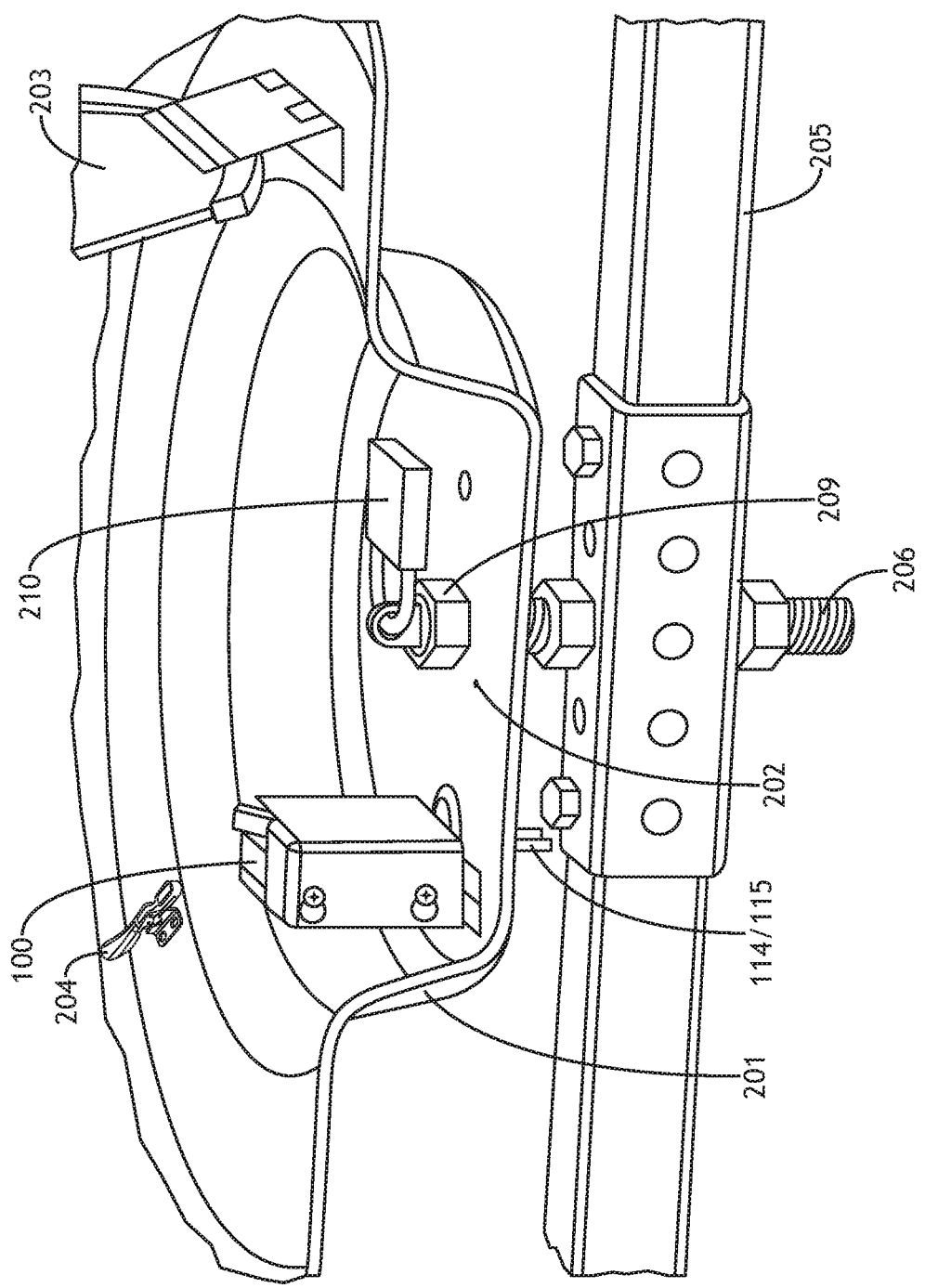
FIG. 8 is a cutaway view of a fiber optic tamper switch integrated into a manhole security pan, in accordance with one or more embodiments of this disclosure.

FIGS. 7 and 8 are diagrams illustrating a cutaway view of a fiber optic tamper switch 100 integrated into a manhole security pan, in accordance with one or more embodiments of this disclosure. In one embodiment, position the fiber optic tamper switch 100 is positioned below a manhole lid to detect removal of the lid or below a security pan 201 that is sometimes included for additional manhole protection. In some embodiments, the security pan 201 may be a lid or cover.

In some embodiments, the security pan 201 is shaped like a deep-dish pan that has a center dip section where a locking mechanism 202 for the security pan 201 is positioned. A small, hinged locking mechanism cover 203 closes over the locking mechanism 202 to prevent any damage to the components in the event that the large, heavy manhole cover is unintentionally dropped onto the pan. The locking mechanism cover 203 is secured in a closed position using a pair of toggle clamps 204. Only one clamp is shown in FIGS. 7 and 8.

The security pan 201 is installed and operates by means of a leger bar assembly 205 that is positioned in the manhole before the security pan 201 is placed onto the manhole ring. The leger bar assembly 205 has a center threaded post 206 with a pull cable attached to its tip (cable not shown). Extension bars 207 are attached on either end of the leger bar assembly 205. Once the security pan 201 is set in place onto the lip of a manhole ring casting 208, the ledger bar assembly 205 is pulled upward by means of the attached cable until the extension bars 207 make contact with the manhole ring casting 208 or another fixed manhole feature. In this position, the threaded center post 206 has passed upward through the center hole in the secondary pan 201. A nut 209 is then tightened onto the threaded center post 206 to lock the security pan 201 to the manhole. A secondary padlock 210 is often used to further secure the nut 209 from being removed or loosened.

In some embodiments, the switch baseplate 102, fiber clamp block 152 and switch cover 106 components are configured to mount to the bottom surface of the security pan 201 inside the center dip section. In some embodiments, formed tabs on the switch cover 106 are used to mount the fiber optic tamper switch 100 to the security pan 201. The optical fiber 114 or fiber optic cable 115 would pass through an opening in the security pan 201 from below and be routed inside the fiber optic tamper switch 100 through the guide pins 148 and the fiber guide region 144 as previously described. A rubber grommet may be used in the opening of the security pan 201 to protect the optical fiber 114 or fiber optic cable 115 from damage by the edges of the opening. The fiber optic tamper switch 100 would be triggered by the opening of the small, hinged cover 203, and would result in a detection of an intrusion attempt by the fiber optic tamper switch system 400. The detection would then be followed by a delay in accessing the manhole because of the robust physical barrier (i.e. security pan 201). The delay in access provides an opportunity for a security response to reach the intrusion area and prevent access to the protected space. This combination of detection followed by delay is the primary objective of any robust security system.

In some embodiments, The fiber optic tamper switch 100 mounts directly to the security pan 201 surface. The fiber optic tamper switch 100 is further configured to be detachable from the security pan 201, the optical fiber 114 or fiber optic cable 115, and then replaced with a new fiber optic tamper switch 100 without having to remove the security pan 201.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically interactable and/or physically interacting components and/or wirelessly interactable and/or wirelessly interacting components and/or logically interactable and/or logically interacting components.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A fiber optic tamper switch for detecting unauthorized movement of a moveable member, comprising:
   a component subassembly block; a cover encompassing the component subassembly block;
   a toggle arm comprising:
      a first end coupled to a first shaft or hub arising substantially perpendicular to a face of the component subassembly block, wherein the toggle arm is configured to rotate along a central axis of the first shaft or hub; and
      a second end extending through the cover, permitting the second end to contact the moveable member, wherein a movement of the moveable member actuates a rotation of the toggle arm along the first shaft or hub;
   a fiber capture bar configured to thread an optical fiber or a fiber optic cable through a recess within the fiber capture bar; and
   a fiber press bar comprising:
      a first end coupled to a second shaft or hub arising substantially perpendicular to the face of the component subassembly block, wherein the fiber press bar is configured to rotate along a central axis of the second shaft or hub; and
      a coupling configured to couple the fiber press bar to the fiber capture bar, wherein the rotation of the toggle arm actuates the fiber press bar, translating the fiber capture bar in a first direction and effecting a bend in the at least one of the optical fiber or the fiber optic cable, the bend effecting at least one of an attenuation or a dispersion of a light signal within the at least one of the optical fiber or fiber optic cable indicating a tamper; and one or more locking mechanisms coupled to at least one of the toggle arm or the fiber press bar preventing the translation of the fiber capture bar and an unbending of the at least one of the optical fiber or the fiber optic cable;
a fiber optic light source communicatively coupled to at least one of the optical fiber or fiber optic cable;
a fiber optic light detector communicatively coupled to at least one of the optical fiber or fiber optic cable;
a controller communicatively coupled to at least one of the fiber optic light source, the fiber optic light detector, or the at least one of the optical fiber or the fiber optic cable, the controller configured to:
control the light signal broadcast through the at least one of the optical fiber or the fiber optic cable; and
determine at least one of the attenuation or dispersion of the light signal from the at least one of the optical fiber or the fiber optic cable; and
a user interface communicatively coupled to the controller, wherein the user interface is configured to receive and display data from the controller.

2. The fiber optic tamper switch of claim 1, further comprising a mounting bracket configured to attach the fiber optic tamper switch to a surface.

3. The fiber optic tamper switch of claim 2, further comprising at least one bracket extender configured to attach the fiber optic tamper switch to the mounting bracket, wherein the at least one bracket extender is further configured to position the fiber optic tamper switch within a three-dimensional space relative to the mounting bracket.

4. The fiber optic tamper switch of claim 1, further comprising cover slots on two or more sides of the cover configured to permit threading at least one of the optical fiber or the fiber optic cable through the cover.

5. The fiber optic tamper switch of claim 1, further comprising a release mechanism configured to release the one or more locking mechanisms, wherein the release mechanism is accessible upon removing the cover of the fiber optic tamper switch.

6. The fiber optic tamper switch of claim 1, wherein a motion of at least one of the fiber press bar and the fiber capture bar is adjustable to control the bending of the at least one of the optical fiber or fiber optic cable.

7. The fiber optic tamper switch of claim 1, further configured to readily switch between a locking mode and a non-locking mode.

8. The fiber optic tamper switch system of claim 1, wherein the fiber optic tamper switch is integrated within an access delay mechanism, wherein the access delay mechanism delays access to a protected asset or area.

9. A fiber optic tamper switch system, comprising:
at least one of an optical fiber or a fiber optic cable;
a fiber optic tamper switch for detecting unauthorized movement of a moveable member, the fiber optic tamper switch comprising:
a component subassembly block;
a cover encompassing the component subassembly block a toggle arm comprising:
a first end coupled to a first shaft or hub arising substantially perpendicular to a face of the component subassembly block, wherein the toggle arm is configured to rotate along a central axis of at least one of the first shaft or hub; and
a second end extending through the cover, permitting the second end to contact the moveable member, wherein a movement of the moveable member actuates a rotation of the toggle arm along the first shaft or hub;
a fiber capture bar configured to thread the optical fiber or the fiber optic cable through a recess within the fiber capture bar;
a fiber press bar comprising:
a first end coupled to a second shaft or hub arising substantially perpendicular to the face of the component subassembly block, wherein the fiber press bar is configured to rotate along a central axis of the second shaft or hub; and
a coupling configured to couple the fiber press bar to the fiber capture bar, wherein the rotation of the toggle arm actuates the fiber press bar, translating the fiber capture bar in a first direction and effecting a bend in the at least one of the optical fiber or the fiber optic cable, the bend effecting at least one of an attenuation or a dispersion of a light signal within the at least one of the optical fiber or the fiber optic cable indicating a tamper;
one or more locking mechanism coupled to at least one of the toggle arm or the fiber press bar preventing the translation of the fiber capture bar and an unbending of the at least one of the optical fiber or fiber optic cable;
a fiber optic light source communicatively coupled to at least one of the optical fiber or fiber optic cable;
a fiber optic light detector communicatively coupled to at least one of the optical fiber or fiber optic cable;
a controller communicatively coupled to at least one of the fiber optic light source, the fiber optic light detector, or the at least one of the optical fiber or the fiber optic cable, the controller configured to:
control the light signal broadcast through the at least one of the optical fiber or the fiber optic cable; and
determine at least one of the attenuation or dispersion of the light signal from the at least one of the optical fiber or the fiber optic cable; and
a user interface communicatively coupled to the controller, wherein the user interface is configured to receive and display data from the controller.

10. The fiber optic tamper switch system of claim 9, wherein the controller is configured to determine that an attenuation or dispersion of at least one of the optical fiber or the fiber optic cable has occurred without reporting specific location identification.

11. The fiber optic tamper switch system of claim 9, wherein the controller is configured to determine a location of the fiber optic tamper switch, wherein at least one of an attenuation or dispersion of the at least one of the optical fiber or the fiber optic cable has occurred.

12. The fiber optic tamper switch system of claim 9, wherein the controller utilizes optical time-domain reflectometry to detect a position of least one of an attenuation or dispersion of the light signal within the at least one of the optical fiber or fiber optic cable.

13. The fiber optic tamper switch system of claim 9, wherein the fiber optic tamper switch further comprises a mounting bracket configured to attach the fiber optic tamper switch to a surface.

14. The fiber optic tamper switch system of claim 13, further comprising at least one bracket extender configured to attach the fiber optic tamper switch to the mounting bracket, wherein the at least one bracket extender is further configured to position the fiber optic tamper switch within a three-dimensional space relative to the mounting bracket.

15. The fiber optic tamper switch system of claim 9, wherein the fiber optic tamper switch further comprises a target plate coupled to the moveable member, wherein the target plate contacts the toggle arm.

16. The fiber optic tamper switch system of claim 9, further comprising cover slots on two or more sides of the cover configured to permit threading at least one of an optical fiber or fiber optic cable through the cover.

17. The fiber optic tamper switch system of claim 9, further comprising a release mechanism configured to release the one or more locking mechanisms, wherein the release mechanism is accessible upon removing the cover of the fiber optic tamper switch.

18. The fiber optic tamper switch system of claim 9, wherein multiple fiber optic tamper switches may be installed on a single optic fiber or single fiber optic cable.

19. The fiber optic tamper switch system of claim 9, further configured to readily switch between a locking mode and a non-locking mode.

20. The fiber optic tamper switch system of claim 9, wherein the fiber optic tamper switch is integrated within an access delay mechanism, wherein the access delay mechanism delays access to a protected asset or area.

* * * * *